April 18, 1944.  T. B. LEWIS  2,347,115
DERRICK CONSTRUCTION
Filed Oct. 18, 1941  5 Sheets-Sheet 2
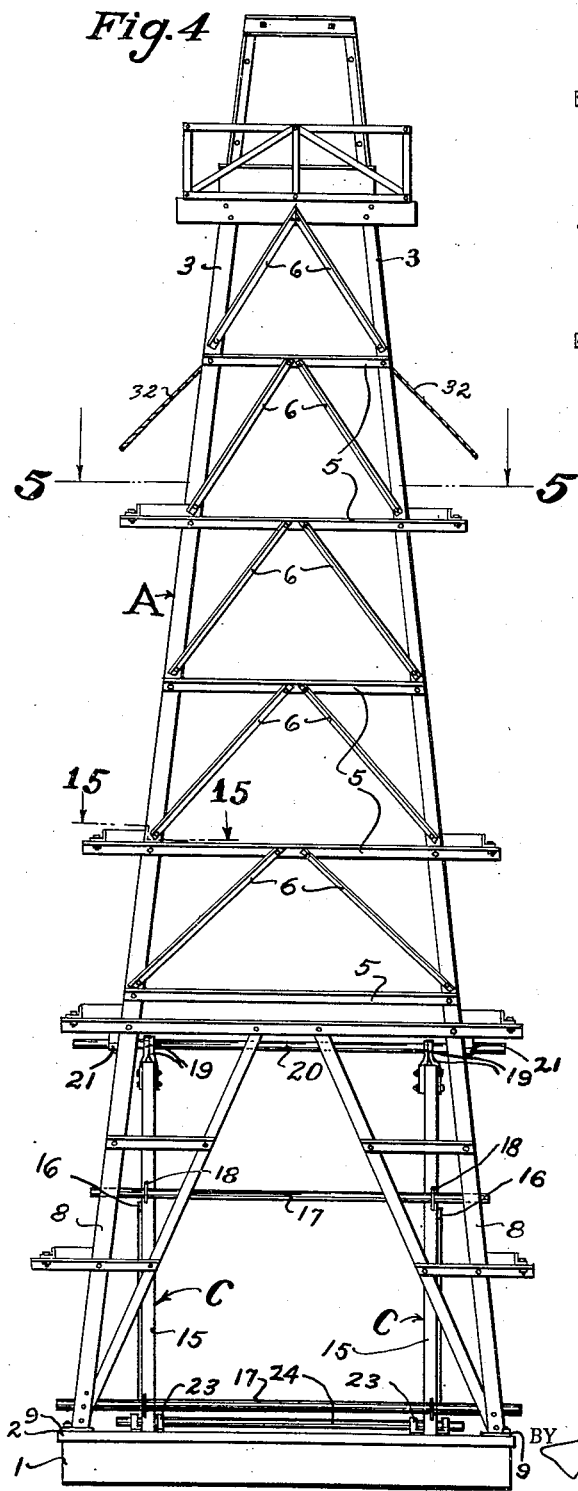
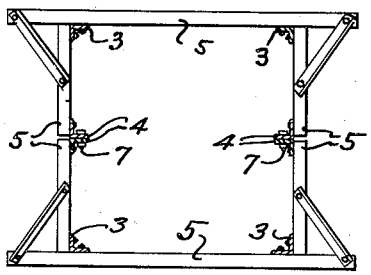
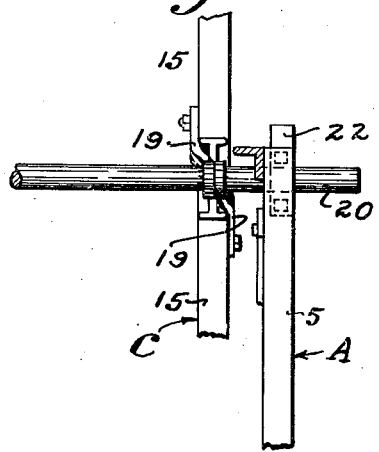
Thomas B. Lewis
INVENTOR.
ATTORNEY.

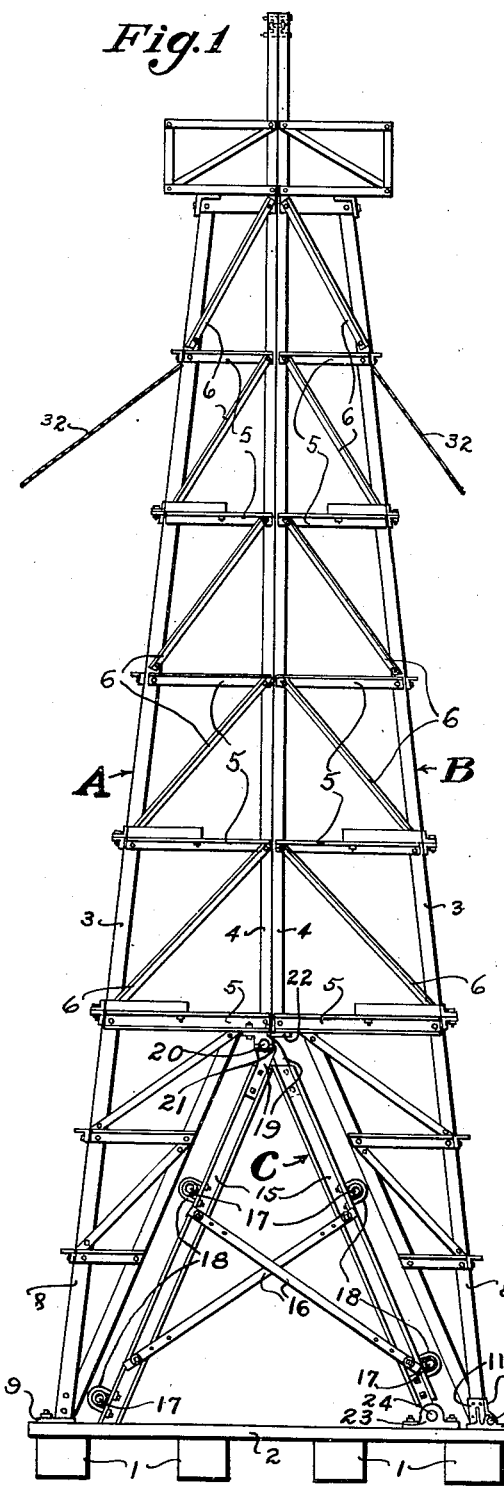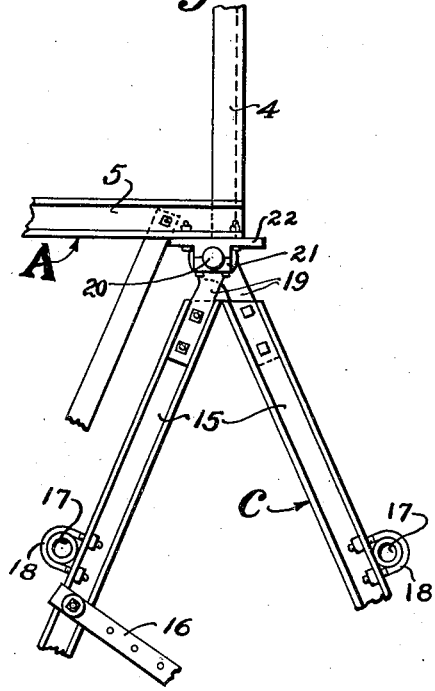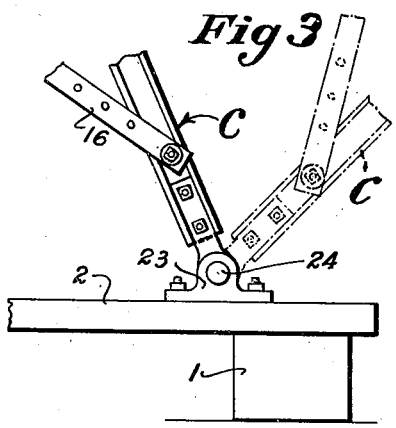

April 18, 1944.    T. B. LEWIS    2,347,115
DERRICK CONSTRUCTION
Filed Oct. 18, 1941    5 Sheets-Sheet 3
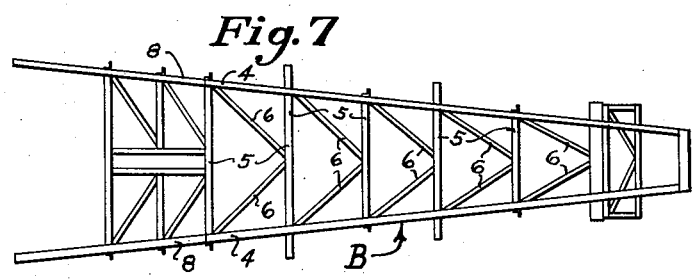
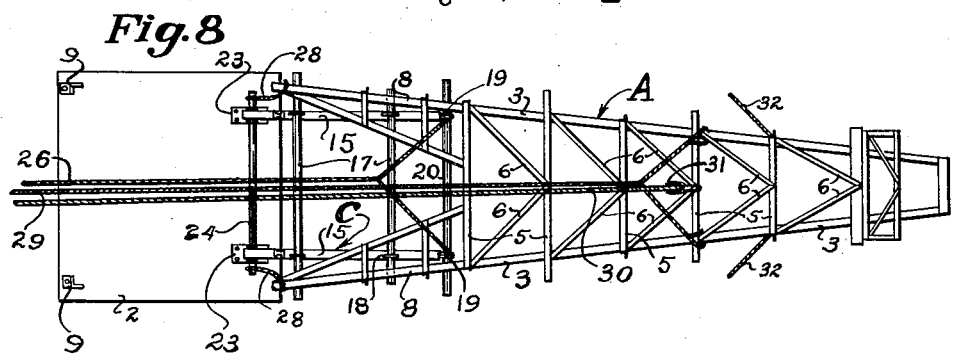
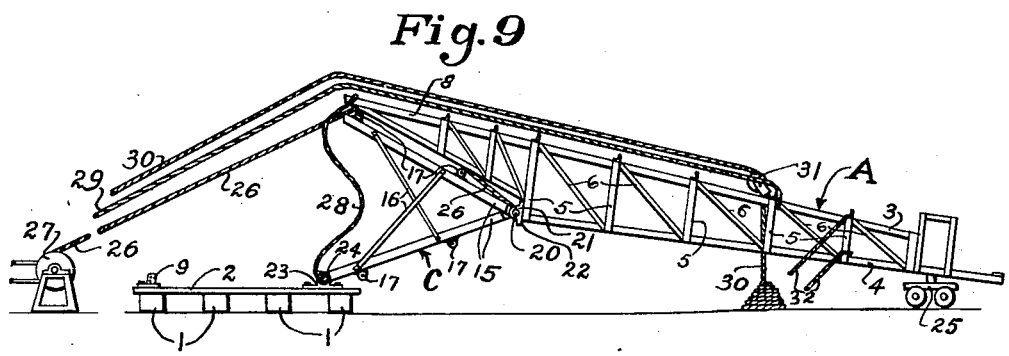
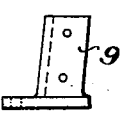
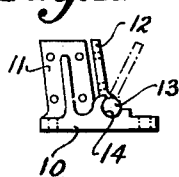
*Thomas B. Lewis*
INVENTOR.
BY
ATTORNEY.

April 18, 1944.  T. B. LEWIS  2,347,115
DERRICK CONSTRUCTION
Filed Oct. 18, 1941　　　5 Sheets-Sheet 4

Thomas B. Lewis
INVENTOR.

BY *J. Auston Swicher*
ATTORNEY.

April 18, 1944.　　　T. B. LEWIS　　　2,347,115
DERRICK CONSTRUCTION
Filed Oct. 18, 1941　　　5 Sheets-Sheet 5
*Fig.14*
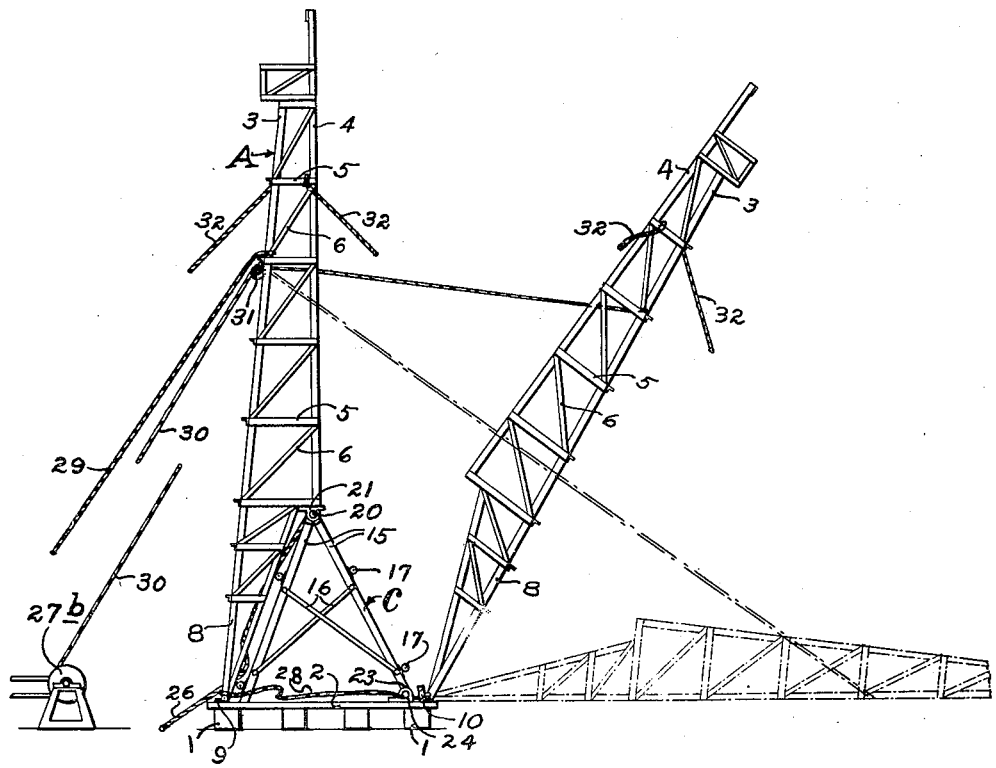
*Fig.15*
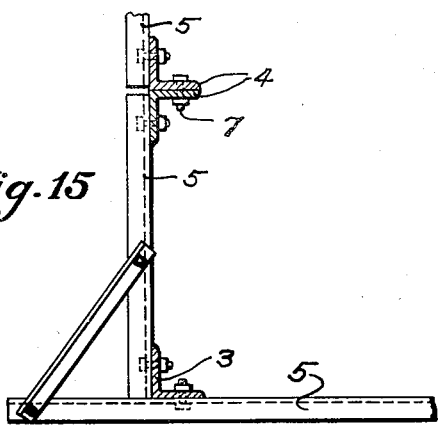
*Thomas B. Lewis*
INVENTOR.
ATTORNEY.

Patented Apr. 18, 1944

2,347,115

UNITED STATES PATENT OFFICE 2,347,115

DERRICK CONSTRUCTION

Thomas B. Lewis, Wichita Falls, Tex.; Leona Wilson Lewis, community administratrix of said Thomas B. Lewis, deceased, assignor of one-third to James C. Davis, Jr., Fort Worth, and one-third to Frank N. Lewis, Phillips, Tex.

Application October 18, 1941, Serial No. 415,615

13 Claims. (Cl. 189—15)

This invention relates to an improvement in derrick construction, and is an improvement on the manner of constructing a derrick as shown in my prior application on Derricks, Serial No. 336,050, filed May 18, 1940. In my aforesaid application, provision was made for constructing the derrick of sectional form, with certain of the sections thereof hoisted to set-up form upon previously erected sections, which resulted in some difficulty and danger in the manipulation and fabrication of the various derrick parts while the derrick is being built.

The object of this invention is to simplify and improve the construction of the derrick sections and to eliminate the dangers incident to the erection of the derrick, while yet providing a construction which is just as rigid and serviceable in set-up form as a derrick built in one unit from the ground up.

This is accomplished by the fabrication of derrick half-sections in prone positions on the ground, with provision of practical means for the erection of these sections in a simple manner into upright abutting relation where they may be secured directly together to form a rigid derrick. The separate erection of the two derrick half-sections makes it possible for the derrick to be set-up without the necessity for risking workmen thereon until the derrick sections have been brought into contacting relation and are ready for the secure fastening of the sections together, thereby obviating the danger of workmen falling from the derrick in the construction thereof.

A preferred embodiment of the invention is illustrated in the accompanying drawings, in which:

Fig. 1 is a side elevation of the completed derrick in upright erected position;

Fig. 2 is an enlarged detail side elevation of connected portions of the V-frame and derrick sections;

Fig. 3 is a similar view of the mounting of the V-frame on the base;

Fig. 4 is a side elevation of the erected derrick at right angles to Fig. 1;

Fig. 5 is a cross section therethrough on the line 5—5 of Fig. 4;

Fig. 6 is a detail cross section on the line 6—6 of Fig. 2, showing the V-frame connection;

Fig. 7 is a top plan view of one derrick section in prone position;

Fig. 8 is a similar view of the other derrick section in position on the V-frame beside the base;

Fig. 9 is a side elevation thereof;

Fig. 10 is a side elevation of one of the anchoring brackets, detached;

Fig. 11 is a similar view of an anchoring bracket for the other section;

Fig. 14 is a similar view illustrating the erection of the second derrick section; and Fig. 15 is a detail cross section through adjacent connected parts of the derrick sections, on the line 15—15 of Fig. 4.

Figure 12:
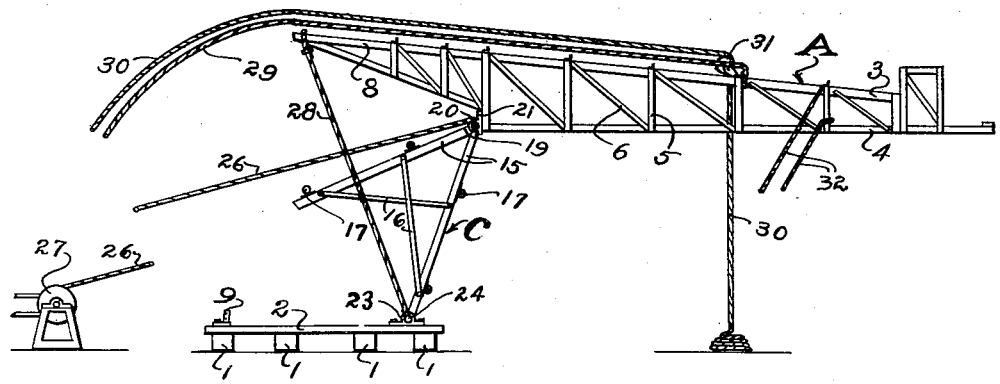
Figs. 12 and 13 are side elevations of one derrick section partly erected.
Figure 13:
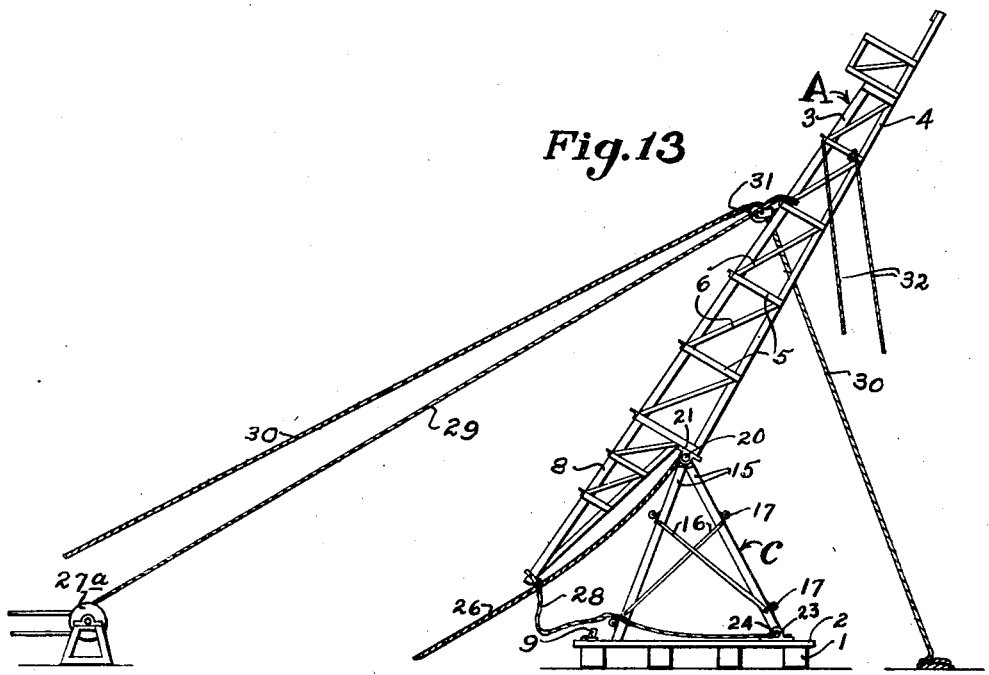

Referring to Figs. 1 to 5, 8 and 9, the derrick is adapted to be erected on a conventional derrick foundation, such as is designated generally by the numeral 1, having a platform 2 mounted thereon for underlying and supporting the derrick and forming a base therefor.

The derrick is constructed preferably of steel of fabricated construction, although any other suitable material may be used as desired. My construction involves the fabrication of two half-sections designated generally A and B, which are adapted to be erected into side-by-side relation and secured together as shown in Figs. 1 and 4. Each of the sections A, B is shown as formed generally like each half unit or the derrick shown in my prior application, Ser. No. 336,050, except that it is fabricated of unitary structure. Each unit is shown as formed of corner posts 3 and inner posts 4, joined together by girts 5 and braces 6. The inner posts 4 are constructed to be assembled in side-by-side relation as shown clearly in Figs. 5 and 15, and secured directly together in such abutting relation by bolts, rivets or other fastenings shown generally at 7.

The lower ends of the half sections A—B are formed of truss shape to provide supporting legs designated generally at 8, with an open space between the separated legs 8, as shown in Fig. 1, for a purpose hereinafter described. When erected, the legs 8 of the section A are secured to the platform 2 by anchoring brackets 9 (Fig. 10). The legs 8 of the section B are secured to the platform 2 by anchoring brackets 10. As shown in Fig. 11, each bracket 10 has an upright integral flange 11 adapted to be rigidly fastened to a side of the adjacent leg 8 for holding the same in place, but said leg is also connected with the bracket 10 by a hinge 12, having a journal pin 13 seated in a notch 14 in the bracket 10 for initially connecting the leg of the section with the bracket as an anchor during the setting up of the half-section, after which the leg is secured to the bracket by the flange 11, being rigidly anchored thereto.

Provision is made for erecting the derrick sections into side-by-side relation, for which purpose I have provided a V-frame mounted on the platform 2 during the setting-up of the derrick sections, which V-frame is designated generally C. The V-frame is shown as formed of arms 15 disposed in diverging relation, substantially in the shape of an inverted V at each opposite side of the derrick, and held in spaced relation by braces 16, extending between the diverging arms as shown in Fig. 1, while the corresponding arms of the V-frame are connected together by tie rods 17 extending therebetween as shown in Fig. 4, which tie rods are anchored to the arms 15 by U-bolts 18. This manner of connecting the respective sides of the V-frame together permits the width of the V-frame to be adjusted according to the derrick to be constructed merely by loosening the U-bolts 18 and sliding the frame arms laterally relative to each other along the tie rods 17.

The converging upper ends of the V-frame arms 15 at each side thereof have hangers 19 rigidly secured thereto and extending into overlapping relation as will be evident from Figs. 2 and 6. A hinge rod 20 extends through the hangers 19, holding the arms 15 together. The hinge rod 20 is of sufficient length to extend normally to a point outside the derrick, as shown in Fig. 8, which allows adjustment of the V-frame sides to accommodate derricks of different sizes.

The hinge rod 20 extends through a bracket 21 detachably secured to the girt 5 of the derrick half-section A, for connecting the V-frame C therewith during the setting-up of the derrick. The bracket 21 has a flange 22 extending laterally beyond the adjacent inner post of the derrick half-section A in position to form a support upon which the corresponding girt 5 of the derrick half-section B may come to rest and be supported during the assembly of the half-sections, as shown in Figs. 1 and 2.

At each side of the V-frame C, one arm thereof is adapted to rest on the platform 2, while the other arm thereof is anchored to the platform by a bracket 23, to which the arm 15 is hinged at 24, as shown in Fig. 3.

In constructing the derrick, the half-sections A—B, are fabricated completely in prone positions on the ground adjacent the platform 2, where they are to be erected. However, these half-sections may be factory made and hauled to the point of use.

The half-section A is shown as being erected first, as illustrated in Figs. 8, 9, 12 and 13. The V-frame C is initially turned on its pivots 24, substantially to a horizontal position, and the leg end of the half-section A is supported thereon, substantially as shown in Fig. 9. The half-section A and V-frame C are connected together by the hinge rod 20, the brackets 21 being attached to the girts 15 of the half-section A, thus forming a pivotal connection between the V-frame and the half-section A. The legs 8 of the derrick section will rest upon the tie rods 17, as shown in Fig. 9. The opposite end of the derrick half-section A is mounted preferably on a dolly 25 upon which it rests lightly to permit bodily movement of the derrick half-section during such erection thereof.

To provide for the raising of the derrick section, a hoisting line 26 is attached at one end thereof to the hinge rod 20, passing over the tie rods 17 of the derrick section to a hoist or winch 27 disposed adjacent the platform 2. The lower end of the leg 8 is connected by means of a line 28 with the platform or the pivot rod 24, to draw the derrick half-section A to an upright position upon swinging movement of the V-frame. A second hoisting line 29 should be attached also to the derrick half-section A and extend therefrom lengthwise over the half section and over the base 2 for a purpose hereinafter described. Likewise, a third hoisting line 30 extends thereover and over a pulley 31 on the half-section A, with the end thereof free to be connected with the half-section B.

With the parts thus assembled in the relation shown in Fig. 9, the half-section A is ready to be erected, which is accomplished merely by the operation of the hoist or winch 27 to wind up the line 26, thus applying a pulling action to the hinge rod 20, swinging the V-frame C about its pivots 24 from the position shown in Fig. 9, to the position shown in Fig. 12, thus lifting the half-section A and moving it inward over the platform 2. This continues until the free ends of the V-frame arms come to rest upon the platform 2, at a point intermediate the positions shown in Figs. 12 and 13. As the pull is thus applied to the V-frame C, the cable 28 is tightened, tending to swing the half-section to an upright position. The line 29 which is connected at one end with the half-section is then attached to the same or a companion hoist 27a (Fig. 13) and pulled inward, raising the derrick half-section A to an erected position, bringing the legs 8 thereof into supported position on the platform, with the corner posts 3 seated upon the brackets 9 to which they may be secured by bolts, rivets, or other fastenings, when said derrick section is then held in its erected position.

The half-section A may be braced securely in its erected position, if desired, by guy wires 32 shown in Fig. 14, which are attached thereto before erection capable of being secured in place therefor for securely anchoring said section.

After thus erecting the half-section A, the fabricated section B is brought into prone position beside the platform 2, as shown in dotted lines in Fig. 14. The legs of the section B have the hinges 12 attached thereto which are then set with the pivot pins 13 in the sockets 14 of the brackets 10 on the platform, thereby forming a hinge connection between the section B and the platform, ready for the lifting action. The loose end of the cable 30 is attached to the section B, while the opposite end of said cable is wound on the same or another winch designated 27b. This winch is then operated to wind up the cable 30, swinging the derrick half-section B from its prone position to an erect position, as will be evident in Fig. 14, which action continues until the half-section B is brought into abutting relation against the half-section A, as shown in Fig. 1. The inner posts 4 of the half-sections are then secured together rigidly by the fastenings shown at 7, and the two half-sections then become a rigid unitary structure, bracing against each other and forming substantially a single unit.

After thus erecting the derrick with the sections secured in side-by-side relation, the V-frame C is preferably removed by disconnection of the brackets 21 from the girts 5, and the brackets 23 from the platform 2, after which the V-frame may slide out from beneath the derrick as will be evident from Fig. 1. Thus a single V-frame may be used repeatedly in the erection of derrick sections and is not required for continuous use as a part of the erected derrick.

It will be noted that the erection of the derrick does not require the presence of workmen thereon until both of the derrick half-sections have been moved to upright abutting relation when they are rigid and held ready for the final fastening of the sections together. This eliminates much of the danger to workmen in falling from high points during the fabrication and assembly of derricks, since all of the assembling operations are accomplished on the ground, excepting only the final fastening of the parts together.

This design of the derrick makes it possible to add the inner posts 4 with proper coacting girts and braces to standard derrick sections, so as to convert the same for assembly according to this invention, the setting-up thereof being substantially the same as described.

I claim:

1. A process of erecting a derrick from prefabricated derrick sections, comprising attaching one of said derrick sections substantially in a prone position to a mounting member, simultaneously swinging said mounting member and section in an upward direction relative to a stationary surface with the mounting member moving relative to said section substantially to an upright position, and thereafter moving said derrick section into an erected position and securing the same directly to said stationary surface.

2. A process of erecting a derrick from prefabricated derrick sections, comprising attaching one of said derrick sections substantially in a prone position to a mounting member that has pivotal connections with said derrick section and with a support therefor, swinging said mounting member and section in an upward direction with the mounting member moving relative to said section during said swinging movement substantially to an upright position, and thereafter swinging said derrick section relative to said mounting member to an erected position beside the mounting member and securing the same directly to the support.

3. A process of erecting a derrick from prefabricated sections, comprising attaching one of said derrick sections substantially in a prone position to a mounting member that has pivotal connections with said derrick section and with a support therefor, swinging said mounting member and section in an upward direction with the mounting member moving relative to said section during said swinging movement substantially to an upright position, and thereafter swinging said derrick section relative to said mounting member to an erected position, assembling a second derrick section beside the first-mentioned section, swinging said second section to an upright position beside the first-mentioned section, and securing said sections directly together.

4. A process of erecting a derrick from prefabricated derrick sections, comprising pivotally mounting a swinging frame on a base, mounting an end portion of a derrick section on said swinging frame for pivotal movement relative thereto, swinging said frame substantially to an upright position while moving the connected end of said section therewith to a position substantially over said frame, thereafter swinging said section relative to the frame substantially to an erected position, swinging a second section into an erected position beside the first-mentioned section, and securing said sections directly together.

5. In a derrick construction, the combination with a derrick section having a leg at one side thereof and a supporting portion spaced lengthwise from the end of said leg, of a base, a frame structure pivotally supported on the base, means pivotally mounting the supporting portion of the derrick section on said frame structure for movement of the derrick section with said frame structure and for swinging movement relative thereto, means separately connected with the derrick section and frame structure for causing swinging movement thereof on said pivotal supports, causing movement of the derrick section to an erected position with the leg thereof resting on the base, and a bracket for securing said leg rigidly to the base.

6. In a derrick construction, the combination with a derrick section having a leg at one side thereof and a supporting portion spaced lengthwise from the end of said leg, of a base, a frame structure pivotally supported on the base, means pivotally mounting the supporting portion of the derrick section on said frame structure for movement of the derrick section with said frame structure and for swinging movement relative thereto, means separately connected with the derrick section and frame structure for causing swinging movement thereof on said pivotal supports causing movement of the derrick section to an erected position with the leg thereof resting on the base, a bracket for securing said leg rigidly to the base, a second derrick section pivotally supported on the base, means for swinging the second derrick section to an upright position beside the first-mentioned section, and means for securing said sections directly together.

7. In a derrick construction, the combination of a base adapted to receive a derrick section thereover, a frame structure, means pivotally supporting the structure on the base for swinging movement relative thereto, means for pivotally mounting a derrick section on the frame structure for swinging movement relative thereto substantially to an upright position, and means carried by the frame structure spaced from the last-mentioned pivotal support for bearing thereon of a portion of the derrick section during said erecting movement.

8. In a derrick construction, the combination of a base, an inverted V-frame having side arms spaced apart and diverging from each other, means connecting adjacent end portions of said arms together, means connected with one of said arms at the opposite end thereof for pivotally mounting the frame on the base for swinging movement relative thereto substantially to an upright position, and means for pivotally supporting a derrick section on the connected ends of the side arms of the frame.

9. A derrick construction comprising a base, longitudinal sections connected with the base and extending upwardly therefrom, an upright supporting and erecting member between said sections, means pivoting one end portion of said member to the base, and means pivotally connecting the other end portion of said member to one of the sections.

10. A derrick construction comprising a base, longitudinal sections connected with the base and extending upwardly therefrom in upright side-by-side relation, an upright supporting and erecting member between said sections, means pivoting one end portion of said member to the base for swinging movement of said member relative thereto, and means pivotally connecting the other end portion of said member to one of the upright sections for bodily movement of said connected section with the swinging movement of said member.

11. A derrick construction comprising a base, longitudinal sections connected with the base and extending upwardly therefrom in upright side-by-side relation, an upright supporting and erecting member between said sections, means pivoting one end portion of said member to the base for swinging movement of said member relative thereto, means pivotally connecting the other end portion of said member to one of the upright sections for bodily movement of said connected section with the swinging movement of said member, said last-mentioned connected section having a leg portion extending downwardly beside said member substantially to the base, and means for securing said leg portion directly to the base.

12. A derrick construction comprising a base, an upright derrick section, an upright supporting and erecting member having the lower end portion thereof pivoted to the base, means pivotally supporting the derrick section upon the upper end portion of said member, said derrick section having a leg portion extending downwardly beside said member substantially to the base, and means for securing the lower end of said leg portion directly to the base.

13. A derrick construction comprising a base, an upright derrick section, an A-shaped supporting and erecting member, said member having one side thereof pivoted to the base at the lower end portion of said member, means pivotally supporting the derrick section upon the apex portion of said member, said derrick section having a leg portion extending downwardly beside said member substantially to the base, and means for securing the lower end of said leg portion directly to the base.

THOMAS B. LEWIS.